United States Patent [19]

Duea

[11] Patent Number: 4,632,340
[45] Date of Patent: Dec. 30, 1986

[54] DEVICE FOR PROTECTING PARKED AIRCRAFT

[76] Inventor: Michael J. Duea, 13173 Glenhurst Ave. S., Savage, Minn. 55378

[21] Appl. No.: 754,253

[22] Filed: Jul. 12, 1985

[51] Int. Cl.$^4$ .............................................. B64C 3/58
[52] U.S. Cl. .................................... 244/198; 244/200; 244/1 R; 244/213
[58] Field of Search ............... 244/198, 200, 201, 213, 244/1 R

[56] References Cited

U.S. PATENT DOCUMENTS

| | | | |
|---|---|---|---|
| 1,135,561 | 4/1915 | Ulferts | 244/201 |
| 2,453,403 | 11/1948 | Bogardus | 244/200 |
| 3,108,766 | 10/1963 | Beckman | 244/200 |
| 3,794,275 | 2/1974 | Satter | 244/200 |

FOREIGN PATENT DOCUMENTS 974145  2/1951  France ............................... 244/213

Primary Examiner—Galen Barefoot
Assistant Examiner—Rodney Corl
Attorney, Agent, or Firm—James V. Harmon

[57] ABSTRACT

A removeable spoiler is described for reducing the wing lift of parked aircraft. It includes a spoiler member in the form of a strip temporarily mountable to stand upright and project into the airstream on the top of the wing. It extends parallel to the wing axis and is supported by a clamp contacting the outer surface of the wing for securing the spoiler to the wing.

9 Claims, 8 Drawing Figures

DEVICE FOR PROTECTING PARKED AIRCRAFT

FIELD OF THE INVENTION

The present invention relates to fixed wing aircraft and more particularly to the protection of parked aircraft from high winds.

BACKGROUND OF THE INVENTION

Wind damage to light aircraft stored in the open is notoriously common in part because the flying speed of a light plane is easily achieved in the winds of most thunderstorms. An aircraft that is tied down may even break its anchor cables during a storm because wings produce too much lift for the anchors to withstand. The lifting force on the wings may also cause the wings to suffer internal damage. Thus, aircraft are needlessly damaged or lost every year due to a failure of the tie-down cables. The problem is made worse since empty aircraft are especially vulnerable to damage because the weight of the empty aircraft is only a fraction of the gross weight. Moreover, adequate protection is often difficult to provide when the aircraft is not at its home base. To overcome these problems a development effort was undertaken to provide a removable device for reducing wing lift in the presence of a high wind. It was found that for such a device to be successful, it should be portable, collapsable, easily transported, inexpensive and should be highly effective if the wind is from the front of the wing, but preferably should become inactive when the wind is from the trailing edge of the wing. This is because a wind from the rear produces no lift. In addition, the device used for protecting the aircraft may be more subject to damage when the wind is from the rear. The major objective of the present invention is to provide a portable and low cost, yet effective system for reducing the opportunity for damage to parked aircraft during a windstorm while achieving the other aforementioned design objectives.

These and other more detailed specific objects and advantages of the invention will become apparent during the course of the following description of the invention and in the figures which illustrate the invention by way of example.

SUMMARY OF THE INVENTION

In accordance with the invention a removable spoiler member is provided. The spoiler is adapted to be temporarily mounted on the wing of a parked aircraft to protect the aircraft from high winds. The invention preferably includes a mounting means for securing the spoiler member to the aircraft and in one preferred form of the invention, a hinge is provided between the spoiler and the mounting means to enable the spoiler to pivot forwardly about the hinge but resist rearward pivotal motion so that the spoiler is held in an upright position when the wind strikes the front of the spoiler. The mounting means can be removably mounted on each aircraft wing, for example by means of tie-down cords and clasps engaging the front and rear edge of the wing. The spoiler member is preferably an elongated plate or strip formed from either rigid or flexible sheet material having a longitudinal and transverse axis. The mounting means is preferably constructed for removably securing the strip to the top of the wing and orienting the transverse axis of the strip normal to the top surface of the wing and the longitudinal axis parallel with the wing axis.

In a preferred form of the invention the spoiler strip consists of a flexible and foldable sheet such as a sheet of strong fabric reinforced as required by means of a reinforcing strut framework connected to it, for example by being mounted in pockets extending transversely to the strip of fabric.

THE FIGURES

Figures 5, 8:
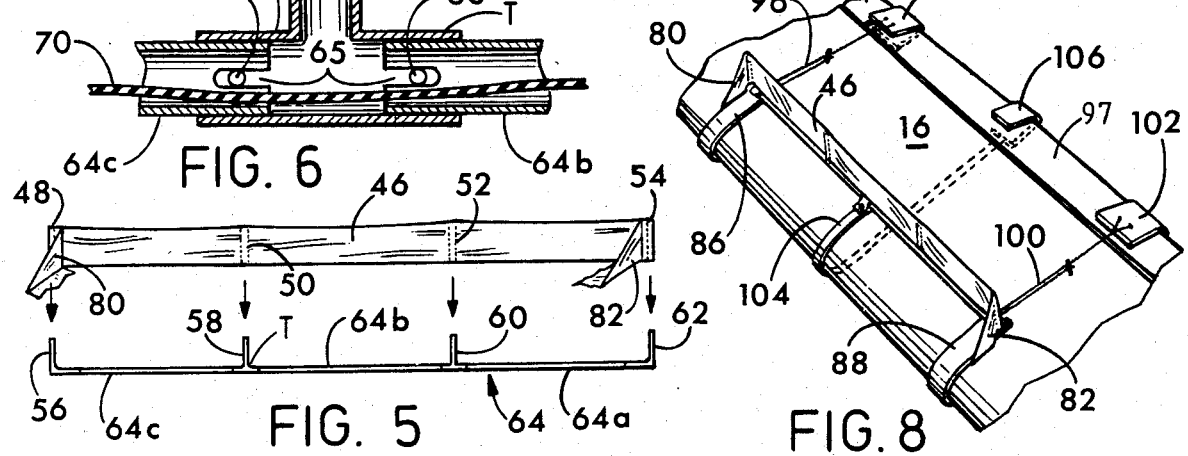

FIG. 5 the front elevational view of the spoiler strip in accordance with the present invention showing the reinforcing struts in position for mounting.

Figure 6:
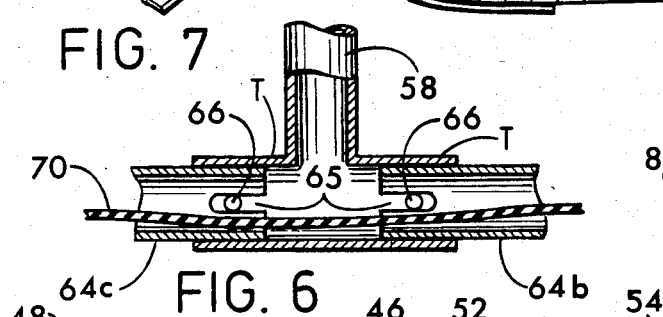

FIG. 6 is a greatly enlarged partial sectional view of a portion of the strut framework.

Figures 3, 7:
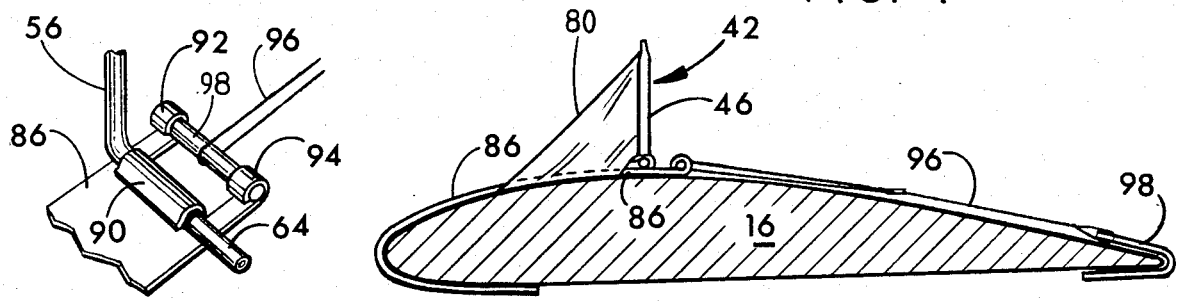
FIG. 3 is a transverse sectional view taken on line 3—3 of FIG. 2.

FIG. 7 is a perspective view of the mounting clasp at the left end of the spoiler device.

FIG. 8 is a perspective view of the spoiler as it appears mounted upon the left wing of the aircraft.

DESCRIPTION OF THE PREFERRED EMBODIMENTS

Shown in the figures is a light aircraft 10 which illustrates a typical application of the invention. While the invention is most useful in connection with light aircraft it is not limited to such an application. The airplane 10 is of the fixed wing type suited for one to eight passengers. It includes the usual fuselage 12, tail 14 wings 16 and 18 cabin 20 and propeller 22. When parked the aircraft is held in place by means of tie-down cables 24 and 28 secured to the wings which are fastened to the ground at 26 and 30 respectively. The tail 14 is also tied to the ground by means of a tie-down cable 32 secured to the ground at 34.

Figure 1:
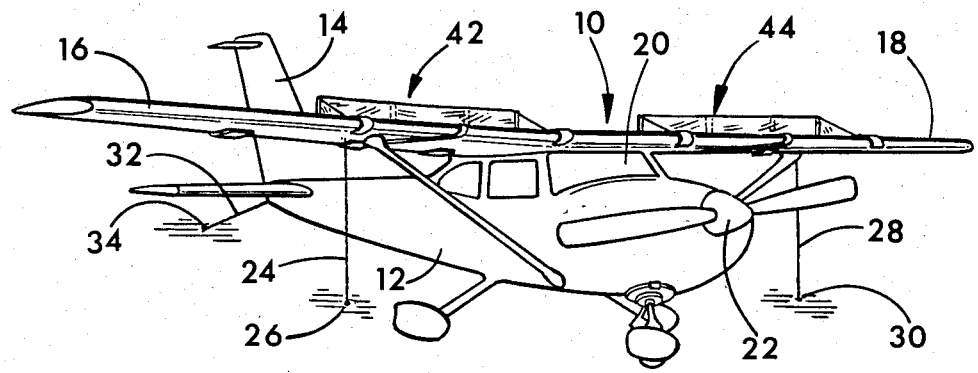
FIG. 1 is a perspective view of a parked aircraft having a spoiler in accordance with the present invention mounted upon each wing.

In accordance with the present invention, a portable spoiler is mounted on each wing the one on the left wing being designated 42 and the one on the right wing being designated 44 in FIG. 1. Each spoiler is identical and therefore only one will be described in detail. Spoiler 42 is composed of an elongated strip or band of rigid or flexible sheet material, in this case strong fabric such as nylon fabric which is easily folded for storage. The strip has a longitudinal axis running horizontially as seen in FIG. 5 and a transverse axis which extends vertically. The transverse dimension of the spoiler 46 can be from say 3 to 6 inches and its length along the longitudinal axis typically 4 to 6 feet. Spaced apart along the length of the spoiler strip 46 are transversely extending longitudinally spaced apart pockets 48, 50, 52, 54 adapted to receive reinforcing struts 56, 58, 60, 62 respectively of a reinforcing framework 64 which holds the spoiler in a flat spread-out i.e. extended condition. The framework 64 also helps to hold the spoiler 46 in an upright position on the top of the wing 16 as shown in FIGS. 5, 6, 7. The reinforcing framework comprises a stiff semi-flexible longitudinally extending frame member composed of three tubular sections 64a, 64b and 64c each connected telescopically within an elbow tube section T at the base of one of the reinforcing struts 56–62. Upright struts 58 and 60 can be glued directly to section 64a. Alternatively, rotation can be prevented by the provision of pins 66 which are connected rigidly to the struts 58 and 60 and extend horizontally through suitable slots 65 at each end of the framework sections 64a–64c. In this way the framework 64 can be broken down into pieces whenever desired by withdrawing the ends sections 64a–64c from the sliding fit within the T sections at the end of the struts. A stretched band of rubber 70 in the nature of a bungi cord extending through it and connected to its ends will hold the framework in the assembled condition shown in FIGS. 5 and 6. Once the framework 64 is assembled, the fabric strip which forms the spoiler is mounted on the framework with the struts located in the pockets.

Figure 2:
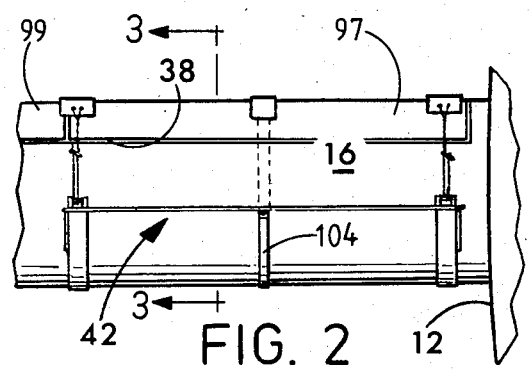
FIG. 2 is a partial plan view of the left wing of the aircraft in FIG. 1 on a larger scale showing the spoiler mounted for use.
Figure 4:
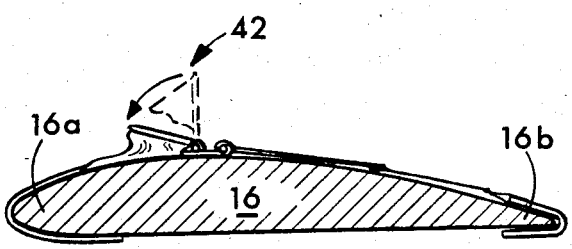
FIG. 4 is a view similar to FIG. 3 on a slightly reduced scale showing the spoiler in collapsed condition.

Mounting means for securing the spoiler of the aircraft will now be described. As shown in FIGS. 5 and 8, flexible retaining members such as fabric gussets 80 and 82 of generally triangular shape extend from each end of the spoiler 46 forwardly and include lower edges secured by means of stitching or adhesive to generally C shaped front mounting anchor hooks or clasps designated 86 and 88 respectively located at opposite ends of the spoiler. Each of the mountings clasps has the same shape as the leading edge of the wing as seen in FIGS. 3 and 4 can be formed from a lightweight strip of sheet aluminum or other suitable material. The clasps 86 and 88 thus extend from the lower surface of the wing forwardly around the leading edge of the wing and upwardly across the top surface of the wing. Each includes an upwardly bent tab at the center designated 90 which serves as a hinge for the framework 64 to allow the framework 64 and the spoiler 46 itself to pivot forwardly about a longitudinal axis at the top of the wing (FIG. 4). The clasps 86 and 88 also include upwardly bent sections 92 and 94 which are in turn secured to a tie cord 96 by means of a removable pin 98 extending between them. The rear end of the tie cord 96 is secured to a removable rear edge clasp 98 which as shown in FIG. 8 is secured over the aileron 99 and flap 97 locking them in place. The locking of the aileron by means of the clasp 98 acts as a reminder which serves as an extra safety measure by locking the controls to prevent the spoiler from being inadvertently left in place before a flight. Secured to the rear end of the front mounting clasp 88 at the left end of the spoiler is a similar tie cord 100 which is secured to a rear edge clasp 102 identical with clasp 98. Each of the clasps 98 and 102 is made from lightweight metal or plastic sheet material folded at its center to the shape of a V of the appropriate size to fit over the rear edge of the wing. At the center of the spoiler is provided a supporting strap 104 which is connected at its upper end to the center of the framework 64 as shown in FIGS. 2 and 8. From the framework 64, the strap 104 extends forwardly around leading edge of the wing and from that point rearwardly beneath the wing and is connected at its rear end to a third rear mounting clasp 106 which is engaged over the rear edge wing. Both of the clasps 106 and 102 are secured to the flap 97. The deployment of the spoiler device will now be described.

To use the spoiler, the strip 46 is unfolded and mounted on the framework 64 as shown in FIG. 5. The clasps 86 and 88 are then slid rearwardly over the leading edge of the wing with the spoiler 46 in an upright position as shown in FIG. 3. The clasps 98 102 and 106 are then placed over the rear edge of the wing and the tie cords 96 and 100 and strap 104 are tightened until the spoiler is held firmly and securely in place. The spoiler 44 is similarly mounted on the left wing of the plane and the invention is ready for use. It will be seen that the spoilers will normally lie flat as shown in FIG. 43. Any wind from the front will cause the spoiler 46 to pivot about the axis of tube 64a–64c to an upright position where it is held by the gussets 80 and 82. However, if the wind comes from the rear of the plane, the spoilers will pivot forwardly about longitudinal axis of the framework 64 i.e. a line of joining the tabs 90 at the rear edges of the clasp 86 and 88 which act as hinges allowing the spoilers to pivot forwardly as shown in FIG. 4. Whenever the wind comes from the front of the wing the spoilers will again take their active upright position as shown in FIGS. 1–4 & 8 drastically reducing the lift provided by each wing thereby lessening the stress produced by the wind and reducing the chance for damage or possible breakage of the tie-down cables 24, 28, 32. It will also be seen that the strap 104 functions to reinforce the framework 64 while the spoiler is operating.

The invention is highly effective in reducing lift by up to 40% or more even though wing design varies greatly from one aircraft to another. It is adaptable to a variety of aircraft and need not extend all the way to the wing tips since much of the lift produced by each wing is provided by the half of the wing closest to the fuselage. The invention thus helps to prevent storm damage to the aircraft by reducing the wing lift developed in a high wind traveling from front to rear across the wing. The invention is inexpensive, lightweight, collapsable and can be easily stored on board the aircraft. Spoilers are attached temporarily in a matter of minutes and function by keeping large sections of the wing in a stalled condition. If one or more of the trailing edge clasps lock the aileron it will serve as a reminder to the pilot that the spoiler is in place.

The invention provides an important advantage over simply strengthening the tie-down cables; namely, a drastic reduction in the upward force on the wing. Thus, while Federal Aviation Administration reports have shown that chains will hold stored aircraft in place during almost any windstorm, the wind can still damage the wings internally. For this reason, the FAA has recommended the use of nylon cords rather than chains for tying down aircraft. The invention is an improvement over such cords or any other type of external restraint since it attacks the problem directly by reducing lift and thereby lessening both internal and external stresses that might damage the aircraft during a storm.

Many variations in the invention within the scope of the appended claims will be apparent to those skilled in the art once the principles of the invention described above are understood.

What is claimed is:

1. A removable spoiler for parked aircraft comprising an elongated spoiler strip formed from sheet material, said sheet material having a longitudinal axis and a transverse axis, mounting means for removably connecting a strip of sheet material to the top of the wing, said mounting means including means for orienting the transverse axis of the strip normal to the top surface of the wing and the longitudinal axis parallel with the wing axis, the mounting means comprises C-shaped clasps adapted to extend over the leading edge of the wing of said aircraft, hinge means connected between the spoiler and each such clasp allowing the spoiler to pivot with respect to the mounting means and releasable retaining means for securing the clasps to the wing.

2. The apparatus of claim 1 wherein the releasable retaining means comprises rear edge clasps adapted to engage the rear edge of the wing and tie-cords extending between the C shaped clasps and the rear edge clasps.

3. A removable, collapsible and pivotable spoiler system for protecting parked aircraft comprising a wind deflecting strip of flexible and foldable sheet material allowing the spoiler to be collapsed for storage, struts formed from stiff material connected to the wind deflecting strip to support it in an extended stretched condition and mounting means connected to the strip to secure the strip to the top of the wing of said aircraft, a front edge clasp extending forwardly from the spoiler for mounting the spoiler, said clasp extending around the leading edge of the wing, a rear edge clasp secured to the rear edge of the wing and a tie cord extending between the front and rear clasps to hold the spoiler securely on the wing, said spoiler including hinge means between the spoiler and the mounting means allowing the spoiler to pivot forwardly about said hinge and means to resist rearward pivotal motion of the spoiler beyond an upright position for holding the spoiler upright when the wind strikes the front of the spoiler.

4. The spoiler of claim 3 wherein said strip is hinged to the mounting means for forward pivotal motion only, but is retained against rearward pivotal motion beyond an upright position whereby the strip will remain upright in an operative position when wind against the strip travels from the front of the wing toward the rear of the wing.

5. The apparatus of claim 4 wherein a gusset formed from fabric is connected between the spoiler strip and the mounting means for retaining the spoiler in an upright position.

6. A spoiler for protecting parked aircraft comprising a wind deflecting strip of flexible foldable sheet material, a framework of stiff material connected to the wind deflecting strip to support it in an extended stretched condition and mounting means connected to the strip to secure the strip to the top of the wing of the aircraft, the framework supporting the spoiler comprises (a) a stiff elongated member extending longitudinally of the spoiler and (b) a plurality of longitudinally spaced apart transversely extending strut members at right angles to the longitudinally extending member secured to the spoiler for reinforcing it and holding it in an extended position and means for releasably and removably connecting said strut members to the elongated member to facilitate disassembly and storage thereof.

7. The apparatus of claim 6 wherein the longitudinally extending framework member comprises a hollow tube separable into a plurality of separate sections telescopically insertable into a portion of one of said struts.

8. The apparatus of claim 7 wherein an elastic band is provided for yielding holding the framework members together.

9. The apparatus of claim 8 wherein pins within the end portions of the struts prevent rotation of the struts on the longitudinally extending framework member.

* * * * *